Patented July 19, 1938

2,124,288

UNITED STATES PATENT OFFICE 2,124,288

FIRE RESISTANT COMPOSITION

Herbert Dodd, Broomhill, Glazebrook, near Manchester, England, assignor to Imperial Chemical Industries Limited, a corporation of Great Britain No Drawing. Application September 11, 1935, Serial No. 40,190. In Great Britain September 19, 1934

9 Claims. (Cl. 106—8)

This invention relates to flame resistance compositions of a plastic nature suitable for use as sealing compounds.

It has previously been proposed to utilize compositions containing a chlorinated naphthalene and a bituminous or wax-like product for the sealing of electrical apparatus. It has also been proposed to incorporate with chlornaphthalenes small proportions of higher molecular organic compounds in order to reduce their brittleness. Such compositions containing chlornaphthalenes as have hitherto been described, do not, however fulfil all the requirements of sealing compounds as it is necessary to apply them in a molten condition. In many instances the application of a sealing compound in a molten state is impossible. It is one of the objects of the present invention to provide sealing compounds which are plastic at normal temperature and which, in addition, are non-inflammable and possess properties rendering them particularly suitable for use in connection with electrical apparatus.

According to the invention, mixtures containing solid chlorinated naphthalene and higher chlorinated hydrocarbons such as chlorinated paraffin wax, are used as the basis for plastic materials adapted for use as sealing compounds which must possess flame and water resistant properties.

Such a mixture is conveniently prepared by melting the chlorinated naphthalene in a suitable vessel and then incorporating the chlorinated paraffin wax by thorough stirring until a homogeneous mixture is obtained. The proportion of the constituents is not critical and will depend to a large extent on the degree of plasticity required in the final product, the temperature at which it will be worked, and the chlorine content of the materials. For example, I have found that suitable flame resisting mixtures can be formed containing from about three up to about twenty parts of chlorinated naphthalene of approximately 54% chlorine content, and one part of chlorinated paraffin wax of approximately 53% chlorine content. As a general guide in the preparation of the mixtures it should be noted that the higher the proportion of chlorinated naphthalene the harder will be the resulting mass. If necessary, however, masses which are not sufficiently plastic at normal temperatures are readily rendered so by slightly raising their temperature, thus rendering them suitable for use as sealing compounds without the necessity of melting.

Various additions can be made to the mixtures described to render them suitable for particular purposes. Filler, pigments and softening agents can be added as can also materials adapted to cover additional flame resistance.

An example of the latter class is hexachlorethane and I find that its addition is particularly suitable when other additions of an inflammable nature have been made to the mass. In the preparation of the compositions containing fillers, pigments etc., I find that it is important to have such additional materials in a fine state of division and to ensure that the final mixing is as complete as possible, as otherwise the electrical properties of the mass are liable to be impaired.

A particularly useful application of the mixture of chlorinated naphthalene and chlorinated paraffin wax is in the production of compositions of a putty-like nature which are resistant to water and retain their sealing power and pliability on prolonged exposure to atmospheric conditions.

The following example illustrates the preparation of a composition according to my invention, but it is to be understood that the scope of the invention is not limited to the particular composition or method of preparation described.

The following quantities of the various ingredients are used:—

| | Percent |
|---|---|
| Chlorinated naphthalene (54% Cl$_2$) | 29.1 |
| Chlorinated paraffin wax (53% Cl$_2$) | 9.0 |
| Oleic acid | 6.5 |
| Petroleum jelly | 5.2 |
| Slaked lime | 3.2 |
| Hexachlorethane | 1.3 |
| China clay | 45.7 |

In preparing the material the chlorinated naphthalene and chlorinated paraffin wax are melted together and the oleic acid, petroleum jelly and hexachlorethane added and thoroughly stirred in, the temperature being maintained at about 100° C. during the mixing. The lime is then added and thoroughly mixed. Reaction occurs with the oleic acid and there may be a small amount of frothing. When this has subsided the china clay is added to the melt during continued stirring. The mass is then allowed to cool after which it is thoroughly masticated on rolls until a completely homogeneous paste is produced. This paste is a putty coloured mass which may be easily worked with the fingers at normal temperatures and retains its pliability at 0° C.

For the production of a black material a small amount of graphite may also be incorporated, and if coloured materials are desired suitable pigments such as iron oxide can be substituted for a small proportion of china clay.

I claim:

1. A flame resistant, plastic composition comprising solid chlorinated naphthalene, a higher chlorinated paraffin wax, and a flame retarding material.

2. The composition of claim 1, in which said flame retarding material comprises hexachlorethane.

3. A flame resistant, plastic composition comprising a solid chlorinated naphthalene, a higher chlorinated paraffin wax, a flame retarding material, and at least one modifying agent.

4. A flame resistant, plastic composition comprising a solid chlorinated naphthalene, a higher chlorinated paraffin wax, a filler, a pigment, and a flame retarding material.

5. The composition of claim 4, in which said flame retarding material is hexachlorethane.

6. The composition of claim 4, in which said filler comprises china clay.

7. A flame resistant, plastic composition comprising a solid chlorinated naphthalene, chlorinated paraffin wax, hexachlorethane, and china clay, said chlorinated hydrocarbons having a chlorine content of about 53%.

8. A flame resistant, plastic composition comprising a solid chlorinated naphthalene, chlorinated paraffin wax, hexachlorethane, china clay, and a pigment, said chlorinated hydrocarbons having a chlorine content of about 53%.

9. The composition of claim 8, in which said pigment comprises graphite.

HERBERT DODD.